United States Patent
Yi et al.

(10) Patent No.: US 10,021,602 B2
(45) Date of Patent: Jul. 10, 2018

(54) MULTI-SESSION TRANSFER METHOD, CALL CONTROL DEVICE, SERVICE CONTINUITY AND CONTINUITY APPLICATION SERVER

(75) Inventors: Qiang Yi, Beijing (CN); Hui Jin, Beijing (CN); Shuiping Long, Beijing (CN); Xiaoyan Duan, Beijing (CN)

(73) Assignee: Huawei Device Co., Ltd., Shenzhen (CN)

( * ) Notice: Subject to any disclaimer, the term of this patent is extended or adjusted under 35 U.S.C. 154(b) by 964 days.

(21) Appl. No.: 13/408,371

(22) Filed: Feb. 29, 2012

(65) Prior Publication Data

US 2012/0155457 A1 Jun. 21, 2012

Related U.S. Application Data

(63) Continuation of application No. PCT/CN2010/076132, filed on Aug. 19, 2010.

(30) Foreign Application Priority Data

Aug. 31, 2009 (CN) .......................... 2009 1 0171816

(51) Int. Cl.
*H04W 36/00* (2009.01)
*H04L 29/06* (2006.01)
(Continued)

(52) U.S. Cl.
CPC ... *H04W 36/0022* (2013.01); *H04L 29/06176* (2013.01); *H04L 29/08621* (2013.01); *H04L 69/24* (2013.01); *H04W 80/10* (2013.01)

(58) Field of Classification Search
CPC . H04W 36/0022; H04W 72/04; H04W 88/08; H04W 84/18
(Continued)

(56) References Cited

U.S. PATENT DOCUMENTS 7,844,293 B2 * 11/2010 Sung ................... H04L 65/4061
455/412.2
2004/0180689 A1 * 9/2004 Nayak ....................... 455/552.1
(Continued)

FOREIGN PATENT DOCUMENTS

CN 101110946 A 1/2008
CN 101325732 A 12/2008
(Continued)

OTHER PUBLICATIONS

Extended European Search Report issued in corresponding European Patent Application No. 10811234.3, dated May 15, 2012.
(Continued)

*Primary Examiner* — Walter Divito
*Assistant Examiner* — Anthony Luo
(74) *Attorney, Agent, or Firm* — Brinks Gilson & Lione (57) ABSTRACT

A multi-session transfer method, a call control device, and a Service Continuity and Continuity Application Server are disclosed. In the embodiments of the present invention, in a multi-session cross-network transfer process, if a second session to be transferred includes video media, a Mobile Switching Center (MSC) server judges capabilities of a current network. If the current network is incapable of transmitting video media, the MSC server sends a request for transferring voice media of the second session to be transferred. The SCC AS receives the transfer request, and converts the second session to be transferred into voice session for transferring or releases the second session to be transferred, and therefore, the problem in the prior art of incapability of transferring the session is avoided, and the cross-network multi-session service transfer is improved.

5 Claims, 6 Drawing Sheets (51) Int. Cl.
*H04L 29/08* (2006.01)
*H04W 80/10* (2009.01)

(58) Field of Classification Search
USPC .......................... 370/328, 352, 331; 709/223
See application file for complete search history.

(56) References Cited

U.S. PATENT DOCUMENTS

| | | | |
|---|---|---|---|
| 2007/0100981 A1* | 5/2007 | Adamczyk et al. | 709/223 |
| 2008/0049725 A1 | 2/2008 | Rasanen | |
| 2008/0267128 A1 | 10/2008 | Bennett et al. | |
| 2009/0219926 A1 | 9/2009 | Long | |
| 2009/0323636 A1* | 12/2009 | Dillon et al. | 370/331 |
| 2010/0329244 A1* | 12/2010 | Buckley et al. | 370/352 |
| 2011/0141979 A1* | 6/2011 | Keller et al. | 370/328 |

FOREIGN PATENT DOCUMENTS

| | | |
|---|---|---|
| EP | 1439725 A1 | 7/2004 |
| WO | WO 2011023074 A1 | 3/2011 |

OTHER PUBLICATIONS

Research in Motion, "Transfer for Media Modifications" Agenda Item 8.6.1, 3GPP TSG SA WG2 Meeting #3. Budapest, Hungary, Feb. 16-20, 2009. S2-090935.

ETSI, "Digital Cellular Telecommunications System (Phase 2+); Universal Mobile Telecommunications System (UMTS); LTE; IP Multimedia System (IMS) Centralized Services" Stage 2, ETSI TS 123 292. V8.4.0, Jun. 2009.

ETSI, "Digital Cellular Telecommunications System (Phase 2+); Universal Mobile Telecommunications System (UMTS); LTE; IP Multimedia System (IMS) Service Continuity" Stage 2, ETSI TS 123 237. V9.3.0, Jan. 2010.

International Search Report issued in corresponding PCT Patent Application No. PCT/CN2010/076132, dated Nov. 25, 2010.

Written Opinion of the International Searching Authority issued in corresponding PCT Patent Application No. PCT/CN2010/076132, dated Nov. 25, 2010.

Ericsson, "MSC Server Enhancement to Support Mid-Call Services During Access Transfer" Change Request 23237 CR 0174—Current Version 9.0.0. 3GPP TSG SA WG2 Meeting #73, Tallinn, Estonia. May 11-15, 2009. S2-093765.

Lte, "$3^{rd}$ Generation Partnership Project; Technical Specification Group Core Network and Terminals; IP Multimedia (IM) Core Network (CN) Subsystem IP Multimedia Subsystem (IMS) Service Continuity" Stage 3 (Release 8). 3GPP TS 24.237, V8.9.0, Jun. 2011.

Rosenberg et al., "An Offer/Answer Model with the Session Description Protocol (SDP)" Network Working Group, Jun. 2002, 22 pages.

Nokia et al., "Clarify determining the capabilities of an UE to act as Controller/Controllee UE" Agenda Item 8.5.2, 3GPP TSG SA WG2 Meeting #72, Mar. 30-Apr. 3, 2009, Hangzhou, China, 8 pages, Sep. 8, 2017.

Lte, "Universal Mobile Telecommunications System (UMTS); LTE; IP Multimedia Subsystem (IMS) Service Continuity; Stage 3" (3GPP TS 24.237 version 8.2.0, Release 8) ETSI TS 124 237, V8.2.0, Jun. 2009, 74 pages.

Lte, $3^{rd}$ Generation Partnership Project; Technical Specification Group Services and Architecture; IP Multimedia Subsystem (IMS) Service Continuity; Stage 2 (Release 9) 3GPP TS 23.237, V9.1.0, Jun. 2009, 88 pages.

GSM, "$3^{rd}$ Generation Partnership Project; Technical Specification Group Services and System Aspects; Potential Mechanisms for CS Domain Video and Voice Service Improvements" (Release 6) 3GPP TR 23.801, V1.0.0, Jun. 2004, 50 pages.

Lte, "$3^{rd}$ Generation Partnership Project; Technical Specification Group Services and System Aspects; Single Radio Voice Call Continuity (SRVCC)" Stage 2 (Release 8) 3GPP TS 23.216, V8.4.0, Jun. 2009, 36 pages.

Na, Chen, English Abstract of "Design and Implementation of PoC System Based on IMS Network," Xian Technical University Master Thesis, 2007, 60 pages.

\* cited by examiner

MULTI-SESSION TRANSFER METHOD, CALL CONTROL DEVICE, SERVICE CONTINUITY AND CONTINUITY APPLICATION SERVER

CROSS-REFERENCE TO RELATED APPLICATIONS

This application is a continuation of international Application No. PCT/CN2010/076132, filed on Aug. 19, 2010, which claims priority to Chinese Patent Application No. 200910171816.X, filed on Aug. 31, 2009, both of which are hereby incorporated by reference in their entireties.

FIELD OF THE INVENTION

The present invention relates to the field of communication technologies, and in particular, to a multi-session transfer method, a call control device, and a Service Continuity Application Server.

BACKGROUND OF THE INVENTION

IP Multimedia Subsystem (IMS) Session Continuity (SC) is a technology of preventing interruption of an underway IMS session when an IMS User Equipment (UE) moves between different access networks and ensuring favorable user experience. The essence of the SC is a Service Centralization and Continuity Application Server (SCC AS), which controls session transfer of a UE between multiple networks.

An IMS Centralized Service (ICS) UE is an IMS UE with enhanced ICS capabilities. The ICS capabilities generally refer to support of a Gm interface or an I1 interface; and a non-ICS UE refers to a UE that supports neither the Gm interface nor the I1 interface, or refers to a UE that supports the Gm interface or the I1 interface but does not use such interfaces to transfer signaling in the communication process.

When a non-ICS UE transfers an ordinary voice session from a Packet-Switched (PS) domain to a Circuit-Switched (CS) domain, the non-ICS UE sends a CS domain signaling (such as setup message) in the CS domain as a transfer request, where the request carries a Session Transfer Number (STN) as a called number; after receiving the request, the SCC AS determines the request as a transfer request according to the STN value, and correlates the related PS domain session, updates the peer, and releases the relevant session in the PS domain to finish the transfer process.

The multi-session transfer of the non-ICS UE from the PS domain to the CS domain supports only transfer of two sessions. Before sending a transfer request, the UE releases other sessions than the two sessions to be transferred. If the UE fails in releasing other sessions, the SCC AS needs to correlate the transfer request with the sessions to be transferred after receiving the transfer request. If more than two sessions exist at this time, the SCC AS can also initiate release of the sessions. The detailed solution is: The active session is transferred first (if no session is active, only the lately held session needs to be transferred); after completion of the transfer, the SCC AS sends information about an active session which is activated before the lately activated session, or information about the lately held session, to a Mobile Switching Center (MSC) server, and the MSC server initiates transfer of a second session in place of the UE.

In the process of researching and practicing the prior art, the inventor of the present invention finds that: When the UE moves from a PS network to a CS network and the UE involves multiple sessions, if the second session transferred is a multimedia session, the prior art does not take into account of abnormality that the second session may be not transferable because the current Radio Access Network (RAN) of the UE does not support video media transmission or the current network resources are not enough for supporting the video media transmission.

SUMMARY OF THE INVENTION

The embodiments of the present invention provide a multi-session transfer method, a call control device, and an SCC AS to overcome the problem that the current network does not support video media processing in a multi-session transfer process.

A multi-session transfer method is provided in an embodiment of the present invention. After completion of transferring a first session of a terminal from a source network domain to a target network domain, the method includes:

receiving, by an MSC server that serves the terminal in the target network domain, state information of a second session of the terminal from an SCC AS, where the second session needs to be transferred, the state information includes a media type of the second session to be transferred, and the media types include video; and sending to the SCC AS, by the MSC server, a request for transferring voice media of the second session to be transferred if the MSC server determines that the target network domain is incapable of transmitting video data, whereupon the SCC AS converts the second session to be transferred into a voice session for transferring or releases the second session to be transferred after receiving the request.

A multimedia session transfer method is provided in an embodiment of the present invention. After completion of transferring a first session of a terminal from a source network domain to a target network domain, the method includes:

sending, by an SCC AS, state information of a second session of the UE to an MSC server that serves the terminal in the target network domain, where the second session needs to be transferred, the state information includes a media type of the second session to be transferred, and the media types include video; and converting the second session to be transferred into a voice session for transferring, or releasing the second session to be transferred, if the SCC AS receives an indication sent by the MSC server because the target network domain is incapable of transmitting video data, where the indication indicates failure of transferring the second session to be transferred.

A call control device provided in an embodiment of the present invention includes:

a receiving unit, configured to receive state information of a second session of the UE from an SCC AS, where the second session needs to be transferred, the state information includes media type of the second session to be transferred, and the media types include video; and a session transfer control unit, configured to: judge whether a target network domain of session transfer is capable of transmitting video data; if the target network domain of session transfer is not capable of transmitting video data, send to the SCC AS a request for transferring voice media of the second session to be transferred, whereupon the SCC AS converts the second session to be transferred into a voice session for transferring or releases the second session to be transferred after receiving the request.

A call control device provided in an embodiment of the present invention includes:

a receiving unit, configured to receive state information of a second session of the terminal from an SCC AS, where the second session needs to be transferred, the state information includes a media type of the second session to be transferred, and the media types include video; and a session transfer control unit, configured to: judge whether a target network domain of session transfer is capable of transmitting video data; if the target network domain of session transfer is not capable of transmitting video data, send to the SCC AS an indication of failure of transferring the second session to be transferred, whereupon the SCC AS converts the second session to be transferred into a voice session for transferring or releases the second session to be transferred after receiving the indication.

An SCC AS provided in an embodiment of the present invention includes:

a sending unit, configured to send state information of a second session of the UE to an MSC server that serves the terminal, where the second session needs to be transferred, the state information includes a media type of the second session to be transferred, and the media types include video; and a session processing unit, configured to receive a request for transferring voice media of the second session to be transferred from the MSC server, and convert the second session into a voice session for transferring or release the second session to be transferred.

An SCC AS provided in an embodiment of the present invention includes:

a sending unit, configured to send state information of a second session of the terminal to an MSC server that serves the terminal, where the second session needs to be transferred, the state information includes media type of the second session to be transferred, and the media types include video; and a session processing unit, configured to: receive an indication sent by the MSC server because a target network domain is incapable of transmitting video data, where the indication indicates failure of transferring the second session to be transferred; and convert the second session to be transferred into a voice session for transferring, or release the second session to be transferred.

In the embodiments of the present invention, in a multi-session cross-network transfer process, if the second session to be transferred includes video media, the MSC server judges the capabilities of the current network. If the current network is incapable of transmitting video media, the MSC server sends a request for transferring voice media of the second session to be transferred. The SCC AS receives the transfer request, and converts the second session to be transferred into voice session for transferring or releases the second session to be transferred, and therefore, the problem in the prior art of incapability of transferring the session is avoided, and the cross-network multi-session service transfer is improved.

DETAILED DESCRIPTION OF THE EMBODIMENTS

The following detailed description is given in conjunction with the accompanying drawings to provide a thorough understanding of the present invention. Evidently, the drawings and the detailed description are merely representative of particular embodiments of the present invention rather than all embodiments. All other embodiments, which can be derived by those skilled in the art from the embodiments given herein without any creative effort, shall fall within the scope of the present invention.

A multi-session transfer method, a call control device, and an SCC AS are disclosed, as detailed below.

Embodiment 1

Figure 1:
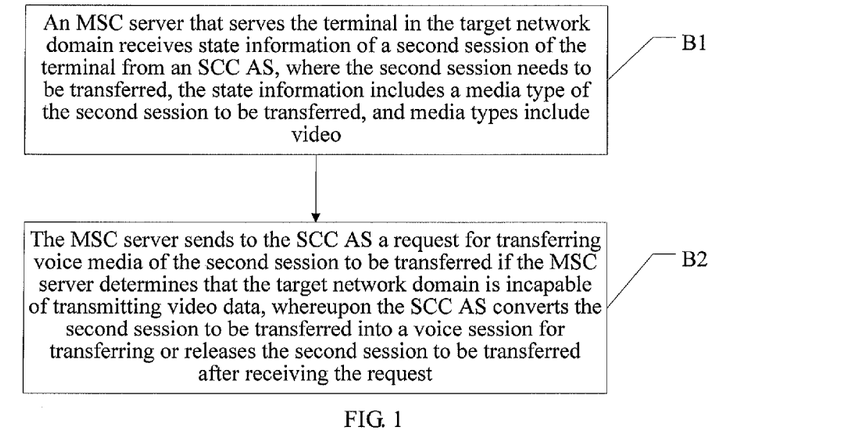
FIG. 1 is a flowchart of a multi-session transfer method according to Embodiment 1 of the present invention.

A multi-session transfer method is provided in this embodiment. As shown in FIG. 1, after completion of transferring a first session of a terminal from a source network domain to a target network domain, the method includes:

B1. An MSC server that serves the terminal in the target network domain receives state information of a second session of the terminal from an SCC AS, where the second session needs to be transferred, the state information includes a media type of the second session to be transferred, and the media types include video.

In this embodiment, the terminal is a non-ICS UE or a UE of similar functions, the source network domain is a PS network domain, and the target network domain is a CS domain.

B2. The MSC server sends to the SCC AS a request for transferring voice media of the second session to be transferred if the MSC server determines that the target network domain is incapable of transmitting video data, whereupon the SCC AS converts the second session to be transferred into a voice session for transferring or releases the second session to be transferred after receiving the request.

In this embodiment, after the SCC AS releases the second session to be transferred, the method may further include the following step:

The MSC Server receives a failure response message sent by the SCC AS in response to the transfer request, and deletes the session state information of the second session to be transferred.

The target network may be incapable of transmitting video data for many reasons. For example, the video data transfer is not supported by the access network or the network bandwidth, or the network resources are not enough (the video service occupies more resources than the voice service).

In this embodiment, the request for transferring voice media of the second session to the SCC AS may be sent in the following way:

Specifically, a core network device sends only a voice media session transfer request to the SCC AS, namely, sets the video media transmission port number in the media row information in the request to 0, and requests to transfer only voice media. In this way, after receiving the request, the SCC AS converts the second session to be transferred in to a voice session for transferring, or releases the second session to be transferred. The MSC server may request the SCC AS to convert the video session into a voice session in many ways, and the conversion mode shall not be construed as limitation on the present invention.

In Embodiment 1, in a multi-session cross-network transfer process, if the second session to be transferred includes video media, the MSC server judges the capabilities of the current network. If the current network is incapable of transmitting video media, the MSC server sends a request for transferring voice media of the second session to be transferred. The SCC AS receives the transfer request, and converts the second session be transferred to be transferred into voice session for transferring or releases the second session be transferred, and therefore, the problem in the prior art of incapability of transferring the session is avoided, and the cross-network multi-session service transfer is improved.

Embodiment 2

Figure 2:
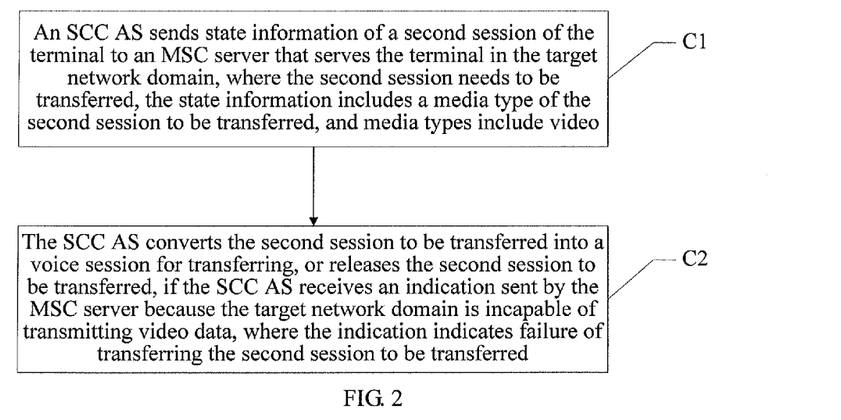
FIG. 2 is a flowchart of a multi-session transfer method according to Embodiment 2 of the present invention.

A multi-session transfer method is provided in this embodiment. As shown in FIG. 2, after completion of transferring a first session of a terminal from a source network domain to a target network domain, the method includes the following steps:

C1. An SCC AS sends state information of a second session of the terminal to an MSC server that serves the terminal in the target network domain, where the second session needs to be transferred, the state information includes a media type of the second session to be transferred, and the media types include video.

C2. The SCC AS converts the second session to be transferred into a voice session for transferring, or releases the second session to be transferred, if the SCC AS receives an indication sent by the MSC server because the target network domain is incapable of transmitting video data, where the indication indicates failure of transferring the second session to be transferred.

In this embodiment, the step of releasing the second session to be transferred includes: releasing the second session to be transferred in the source network domain, and interacting with the communication peer of the terminal to update the communication peer access leg. The session may be released in other ways, and the releasing mode shall not be construed as limitation on the present invention.

In Embodiment 2, when the current network does not support the video session, the SCC AS converts the second session to be transferred into a voice session or releases the second session to be transferred, and therefore, the incapability in the prior art of transferring the session is avoided, and the cross-network multi-session service transfer is improved.

In Embodiment 2, the SCC AS receives the indication of failure of transferring the second session to be transferred sent by the MSC server because the target network domain is incapable of transmitting video data, which may be implemented in the following modes:

Mode 1: The SCC AS receives an indication of failure of transferring the second session from the MSC server. The indication includes a transfer failure cause parameter, and the transfer failure cause parameter indicates that the target network domain is incapable of transmitting the video data. The indication of failure of transferring the second session to be transferred may be carried in an information transfer request message (INFO message) based on a Session Initiation Protocol (SIP), or carried in an instant message.

Mode 2: Before the SCC AS receives the indication of failure of transferring the second session to be transferred sent by the MSC server because the target network domain is incapable of transmitting video data, the method includes:

The SCC AS sends a Subscribe request message to the MSC server.

The SCC AS may receive the indication of failure of transferring the second session to be transferred sent by the MSC server because the target network domain is incapable of transmitting video data by:

receiving a Notify message of the subscription request returned by the core network device, where the Notify message carries an indication of failure of transferring the second session to be transferred.

Figure 3:
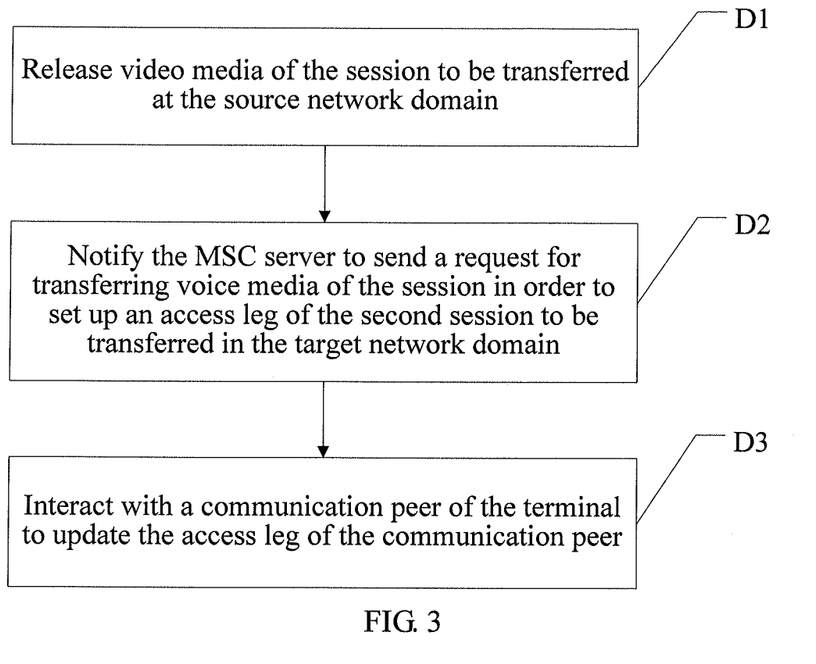
FIG. 3 is a flowchart of converting a second session to be transferred into a voice session for transferring according to an embodiment of the present invention.

As shown in FIG. 3, the step of converting the second session to be transferred into a voice session for transferring in Embodiment 2 includes the following steps:

D1. Release the video media of the session to be transferred at the source network domain;

D2. Notify the MSC server to resend a session transfer request of the voice media type to set up an access leg of the second session to be transferred in the target network domain. Details of notifying the MSC server to resend a session transfer request of the voice media type may be: returning an INFO message to the MSC server, or returning a 200OK in response to the Notify message, or returning a Massage; and D3. Interact with the communication peer of the terminal to update the communication peer access leg.

The communication peer access leg may be updated through the following procedure:

The SCC AS binds the call leg of the second session to be transferred in the target network domain to the call leg of the communication peer.

When the two access legs are bound, the SCC AS is equivalent to a Back to Back User Agent (B2BUA) for implementing communication between both parties.

The SCC AS interacts with the communication peer of the terminal to update the video media of the second session to be transferred to audio media. Because the second session between the terminal and the communication peer in the source network is a video session, the SCC AS needs to perform media negotiation with the communication peer and update the relevant codec information in order to convert the video session into a voice session. The media negotiation may be implemented through Session Description Protocol (SDP) information.

After completion of session transfer, the second session of the terminal in the source network is redundant, and the SCC AS releases the call leg of the terminal in the source network domain.

The following provides application instances based on Embodiment 1 and Embodiment 2 of the present invention and applying specific communication protocols. In the following application instances, the source network domain is a PS domain, and the target network domain is a CS domain.

Figure 4:
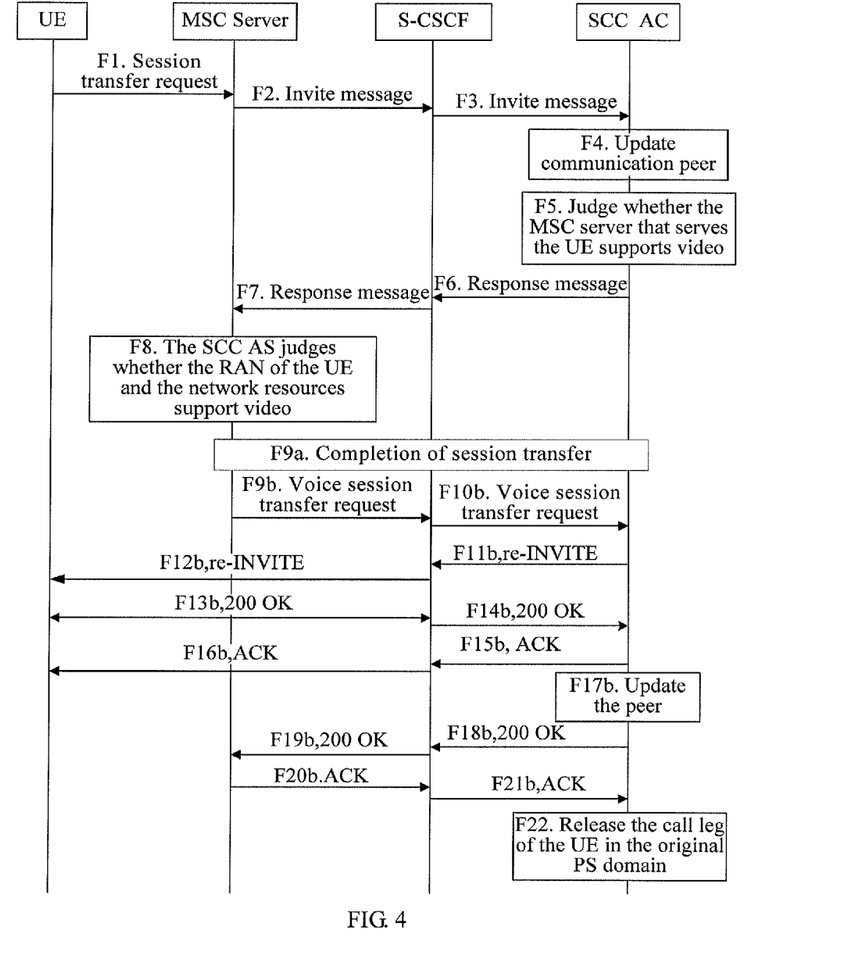
FIG. 4 is a signaling flowchart of a first application instance according to an embodiment of the present invention.

Application Instance 1:

After receiving the multimedia session state information of the second session to be transferred, the MSC server is incapable of transferring the multimedia session for certain reasons. Therefore, the MSC server sends a request for transferring the voice media. The reasons may be: The current RAN of the UE does not support video media transmission, or the network resources are not enough. FIG. 4 is the flowchart:

F1-F4. Same as steps A1-A4 in FIG. 1 in the prior art.

F5. The SCC AS judges whether the MSC server that serves the UE supports video. If the MSC server supports video, the SCC AS delivers state information of the media session, where the state information indicates that the media types include video.

If the MSC server does not support video transmission, the SCC AS releases the video media of the session in the original PS domain in subsequent steps, and delivers the state information of the voice session. The session state information specifies the audio media type, and sets the media row port number of the video to 0.

F6. The SCC AS adds the selected session state information into a 200 OK message, and sends the 200 OK message to a Serving Call Session Control Function (S-CSCF) or an Interrogating Call Session Control Function (I-CSCF) in response to the INVITE request. The following description takes S-CSCF as an example, and the processing in respect of the I-CSCF is the same.

F7. The S-CSCF sends a 200 OK message to the MSC server.

F8. The MSC server receives the state information of the second session (multimedia session), and judges whether video transmission is supported according to the current RAN of the UE and available resources.

F9a. If the current network supports video transmission, the MSC server sends a request for transferring the multimedia session according to the prior art, and then the peer is updated, and the session is transferred.

F9b. If the current network does not support video transmission, only voice media of the session needs to be transferred. The MSC server sends a request for transferring a voice session, and specifically, sets the video media port number in the SDP information in the sent Invite request to 0.

F10. The Invite request is transmitted by the S-CSCF to the SCC AS.

F11b-F12b. The SCC AS determines that the session corresponding to the transfer request is a multimedia session inclusive of video media, and chooses to convert the multimedia session into a voice session and releases the video media in the original PS domain. Specifically, the SCC AS generates a re-INVITE request according to the stored SDP information, and sets the port number corresponding to the video media row in the SDP information to 0. The request for releasing media is transmitted through the S-CSCF to the local UE.

Alternatively, in this embodiment, after receiving the Invite request, the SCC AS finds that the corresponding session involves video media, and rejects to convert the multimedia session into a voice session according to the policy. Therefore, the SCC AS returns a 4 (such as 403 forbidden) response, releases the multimedia session, and then updates the peer before proceeding to step F22. In this embodiment, the policy may be preset on the SCC AS. After receiving the 4 message, the MSC server deletes the session state information of the session.

F13b-F14b. The UE deletes video media and sends a 200 OK response message in response to the re-INVITE request. The 200 OK response message is transmitted through the S-CSCF to the SCC AS.

F15b-F16b. The SCC AS sends an acknowledge (ACK) message in return to the response message, and the ACK message is transmitted through the S-CSCF to the UE.

F17b. The SCC AS updates the peer by using the SDP information in the Invite request sent by the MSC server.

F18b-F19b. The SCC AS returns a 200 OK response in return to the Invite request. The 200 OK response is transmitted by the S-CSCF to the MSC server.

F20b-F21b. The MSC server sends an ACK message which is transmitted through the S-CSCF to the SCC AS. In this way, the call leg (access leg) of the second session in the CS domain is set up.

F22. The SCC AS releases the session of the UE in the original PS domain.

In this embodiment, when the MSC server determines that the CS domain does not support the video media transmission. The MSC server initiates a process of transferring the voice media of the multimedia session, which triggers the SCC AS to release the video media in the original network domain. In this way, the multimedia session is transferred by means of transferring the voice session when network conditions do not permit.

Figure 5:
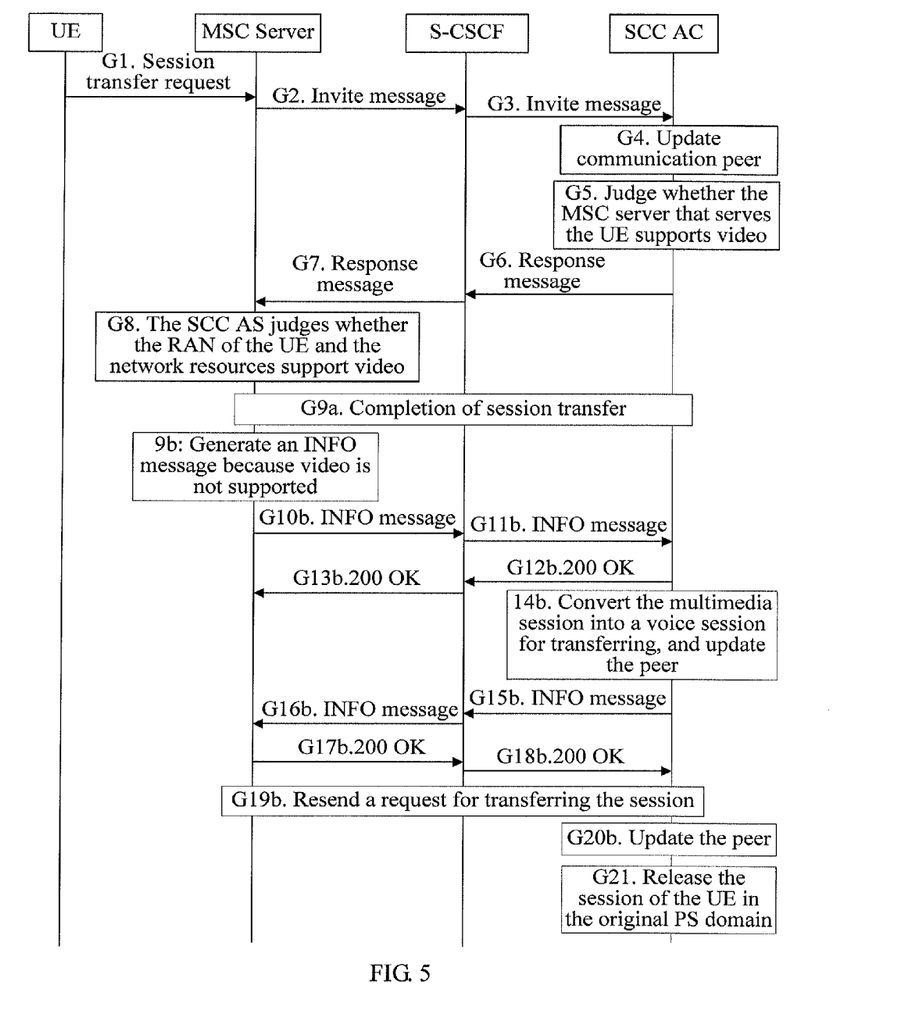
FIG. 5 is a signaling flowchart of a second application instance according to an embodiment of the present invention.

Application Instance 2:

When the MSC server is incapable of transferring a video session for reasons of the CS network, an INFO message may be sent to the SCC AS through a signaling channel set up in a first session. The INFO message indicates failure of transferring the second session and the causes for the failure. After receiving the INFO message, the SCC AS releases the video media in the PS domain, and sends another INFO message which instructs the MSC server to transfer the voice media. As shown in FIG. 5, the procedure includes the following steps:

G1-G9a. Same as steps F1-F9a in application instance 1.

G9b. If the current network does not support video transmission, the MSC server sends an INFO message. The INFO message is transmitted in the channel set up in the first session, and carries an indication of failure of transferring the second session. The indication of failure of transfer may be carried in a message header or a message body, as detailed below:

(i) The indication is carried in a message header. For example, a destination header "subject" of the INFO message carries the indication of failure of transfer. The "subject" header is originally intended for indicating a conversation. In this embodiment, the "subject" header is extended to indicate failure of transferring the session and carry the failure cause.

(ii) The indication is carried in a message body: The message body of the INFO message carries the indication of failure of transfer and the failure cause. The failure cause is "Video_not_supported" or "lack_resource". The message body may be in an Extensible Markup Language (XML) format, as detailed below:

```
<?xml version="1.0"?>
<ati xmlns="urn:3gpp:ns:imscont:ati">
  <aes i="callIdOfSessionY" lt="UEATag" rt="SCCASTag"
  lUri="tel:+1-237-555-1111" rUri="sip:UE3@operator.net"
  s="fail" cause="Video_not_supported/lack_resource"/>
</ati>
```

In the attributes given above, "aes" is information about the second session; "i" is the call identifier (Call-ID) of the second session in the PS domain; "lt" is a tag of the local UE (corresponding to the MSC server); "rt" is a tag of the peer UE; "lUri" is an identifier of the local UE; "rUri" is an identifier of the peer UE; "s" indicates that the optional transfer states are "success", "fail", and "retry"; if the transfer state is "fail", the "cause" refers to the failure cause, and possible causes include "Video_not_supported" and "lack_resource".

The accept header and the Cont ent-Type header of the INFO message are set to "application/vnd.3gpp.ati+xml".

G10b-G11b. The INFO message is transmitted through the S-CSCF to the SCC AS.

G12b-G13b. The SCC AS receives the INFO message and returns a 200 OK response. The 200 OK response is transmitted through the S-CSCF to the MSC server.

G14b. The SCC AS parses the "s" field and the "cause" field in the message body of the INFO message, and finds that the transfer of the multimedia session fails for the foregoing reasons. Therefore, the SCC AS converts the multimedia session into a voice session for transferring, releases the video media of the multimedia session, and updates the peer. The release procedure is the same as steps F11b-F15b in application instance 1. Alternatively, the SCC AS releases the session instead of transferring it. If the SCC AS releases the session, the SCC AS performs step G20b directly. If the MSC server receives no INFO message within a certain period, the MSC server sends no transfer request, but deletes state information of the second session to be transferred.

If the video media are released successfully, the SCC AS generates an INFO message, indicating that the video media are released successfully and the MSC server needs to resend a request for transferring the voice media of the session. Specifically, an indication of resending the transfer request is carried in an XML message body or a "subject" message header of the INFO message. If the indication is carried in the "subject" message header, "transfer_voice" is written in the message header; if the indication is carried in the message body, the message body is as follows:

```
<?xml version="1.0"?>
<ati xmlns="urn:3gpp:ns:imscont:ati">
<aes i="callIdOfSessionY" lt="UEATag" rt="SCCASTag"
lUri="tel:+1-237-555-1111" rUri="sip:UE3@operator.net"
s="retry" cause="transfer_voice"/>
</ati>
```

G15b-G16b. The INFO message is transmitted through the S-CSCF to the MSC server.

G17b-G18b. The MSC server receives the INFO message and returns a 200 OK response. The 200 OK response is transmitted through the S-CSCF to the SCC AS.

G19b. The MSC server receives the INFO message, parses the "s" field and the "cause" field, and resends an Invite request for transferring the session according to the session information.

G20b. The SCC AS receives the transfer request from the MSC server in the CS domain, and updates the peer.

G21. The SCC AS releases the session of the UE in the original PS domain.

In this embodiment, the paper mode of an SIP message may replace the INFO message to perform the foregoing operations. The operation procedure is the same. If the SCC AS does not release the video media successfully, no INFO message needs to be sent to the MSC server, and the second session is released in the original PS network. If the MSC server receives no INFO message within a certain period, the MSC server sends no transfer request, but deletes state information of the second session to be transferred.

In this embodiment, an SIP INFO message (or a paper mode of an instant message) is used to indicate the transfer failure. Therefore, when the network does not support video transmission or the network resources are not enough, the SCC AS converts the multimedia session into a voice session, and notifies the MSC server through an INFO message or an instant message; and the MSC server resends a request for transferring the voice session. The INFO message and the instant message of the paper mode are transmitted in the existing first session channel. It is assumed that the first session is not released while the MSC server judges the network conditions and exchanges information with the SCC AS.

Figure 6:
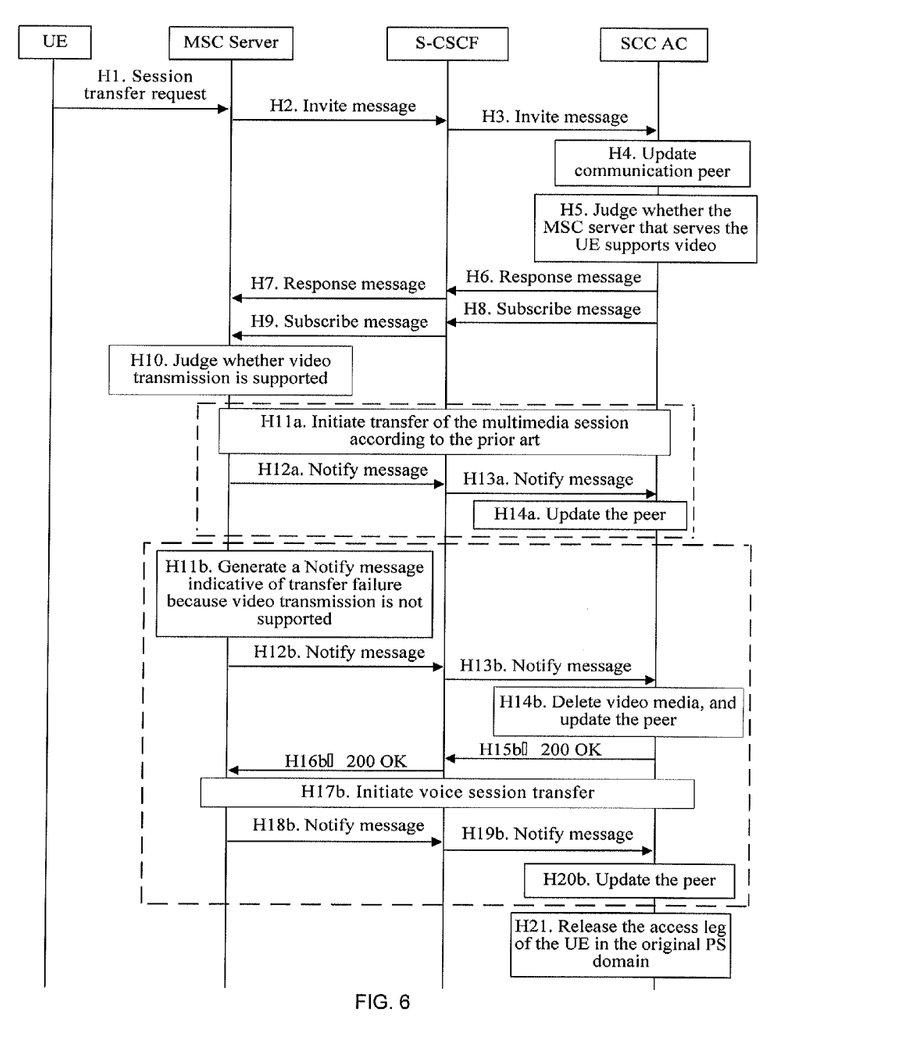
FIG. 6 is a signaling flowchart of a third application instance according to an embodiment of the present invention.

Application Instance 3:

In this application instance, the MSC server subscribes to the transfer state of the second session, and knows whether the session is transferred successfully. If the transfer fails because the target network is incapable of transmitting video media, the SCC AS releases the video media, and notifies the MSC server to initiate transfer of the voice media of the second session to be transferred. Because the subscription request is independent of the session, the subscription may be made in the first session channel already existent, or in a new session channel. As shown in FIG. 6, the procedure includes the following steps:

H1-H7. Same as steps F1-F7 in application instance 1.

H8. The SCC AS delivers a Subscribe request to subscribe to the events related to the UE. The request-URI is the identifier of the UE. An "event" header or a message body of the Subscribe request indicates the subscription event. The subscription event here indicates whether the second session to be transferred is transferred successfully. The "event" header is set to "second_transfer".

The "accept" header of the request indicates the message body format of the Notify message. The format here is XML, for example, "application/vnd.3gpp.ati+xml". The SCC AS may send the Subscribe request only when the second session to be transferred is a multimedia session. The response message returned after the subscription succeeds is omitted here.

H9. The Subscribe request is transmitted through the S-CSCF to the MSC server.

H10. The MSC server receives the state information of the second session (multimedia session) to be transferred, and judges whether video transmission is supported according to the current network conditions of the UE.

H11a. If the current network (network conditions or network resources) supports video transmission, the MSC server sends a request for transferring the multimedia session according to the prior art.

H12a. The second session (multimedia session) to be transferred is transferred successfully, the MSC server sends a Notify message to the SCC AS. The content of the Notify message is embodied in the XML-formatted message body of the Notify. The detailed format of the message body is "application/vnd.3gpp.ati+xml". See also application instance 2. In the attributes, "s" is set to "success"; and "Cause" is set to null.

H13a. The Notify message is transmitted through the S-CSCF to the SCC AS.

H14a. An access leg is set up between the MSC server and the SCC AS in the CS domain successfully, and the SCC AS updates the peer.

H11b. The MSC server determines that the current network is incapable of transmitting video media, and generates a Notify message indicating transfer failure in the format of "application/vnd.3gpp.ati+xml". In the attributes of the message, "s" is set to "fail"; and the cause for failure of transferring the second session is written in "cause", where the cause is "Video_not_supported" or "lack_resource". The meanings of the attributes are described in application instance 2 above.

```
<?xml version="1.0"?>
<ati xmlns="urn:3gpp:ns:imscont:ati">
  <aes i="callIdOfSessionY" lt="UEATag" rt="SCCASTag"
  lUri="tel:+1-237-555-1111" rUri="sip:UE3@operator.net"
  s="fail" cause="Video_not_supported/lack_resource"/>
</ati>
```

The message body of the "application/vnd.3gpp.ati+xml" format further includes the information related to the session to be transferred. The Notify response message here may include such session information (including the items except the "s" attribute and the "cause" attribute) so that the SCC AS can make judgment and perform the release operation. Alternatively, the Notify message includes only the "s" attribute and the "cause" attribute instead of the session information, and the SCC AS knows the subscription event and knows the session information about the second session to be transferred according to the stored session information.

H12b. The Notify message is transmitted to the S-CSCF.

H13b. The Notify message is transmitted through the S-CSCF to the SCC AS.

H14b. The SCC AS receives the Notify message, and parses the "s" field and the "cause" field in the message, and finds that the transfer of the multimedia session fails for the foregoing reasons. Therefore, the SCC AS converts the multimedia session into a voice session for transferring, releases the video media of the multimedia session in the PS domain according to steps F11b-F15b in application instance 1, and updates the peer. Alternatively, the SCC AS releases the session instead of transferring it. If the SCC AS releases the session, the SCC AS returns a 200 OK message in response to the Notify message, and updates the peer before performing step H21. If the MSC server receives no indication of resending a request within a certain period, the MSC server sends no more transfer request, but deletes state information of the second session to be transferred.

H15b. The SCC AS sends a 200 OK response message in return to the Notify message. If the SCC AS releases the video media successfully, the message body of the 200 OK response instructs the MSC server to resend a request for transferring voice media of the session. The message body is the same as that in application instance 2:

```
<?xml version="1.0"?>
<ati xmlns="urn:3gpp:ns:imscont:ati">
  <aes i="callIdOfSessionY" lt="UEATag" rt="SCCASTag"
  lUri="tel:+1-237-555-1111" rUri="sip:UE3@operator.net"
  s="retry" cause="transfer_voice"/>
</ati>
```

If the SCC AS fails in releasing the video media, the SCC AS attempts to release the second session without sending any indication to the MSC server. If the MSC server receives no indication of resending a request within a certain period, the MSC server sends no more transfer request, but deletes state information of the second session to be transferred.

H16b. The 200 OK response is transmitted through the S-CSCF to the MSC server.

H17b. The MSC server receives the response, and parses the message body of the response to know the need of sending a request for transferring the voice media.

H18b-H19b. If the MSC server transfers the voice media successfully, the MSC server sends a Notify message to the SCC AS. The content of the message is described in step H12a.

H20b. The peer is updated, and the session connection is set up between the UE and the communication peer.

H21. The original PS network session is released.

After a period, the SCC AS may cancel the subscription relation with the MSC server.

In this embodiment, the SCC AS subscribes to the state of transferring the second session, and receives the Notify message from the MSC server. If the network is incapable of transferring the multimedia session, the SCC AS is triggered to release the video media and convert the multimedia session into a voice session for transferring, and the MSC server transfers the voice media of the session or the SCC AS releases the second session to be transferred instead of performing transfer.

Persons of ordinary skill in the art should understand that all or a part of the steps of the method in the embodiments of the present invention may be implemented by a program instructing relevant hardware. The program may be stored in computer readable storage media. The storage media may be a Read-Only Memory (ROM), Random Access Memory (RAM), magnetic disk, or CD-ROM.

Embodiment 3

Figure 7:
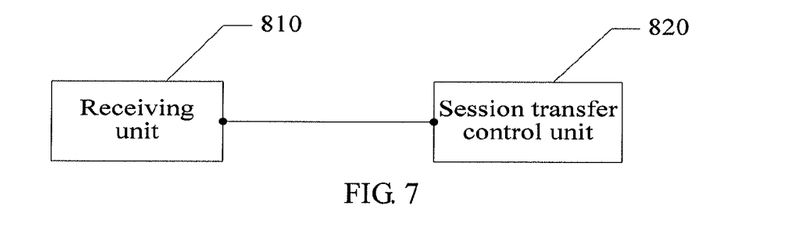
FIG. 7 is a schematic structure diagram of a call control device according to Embodiment 3 of the present invention.

As shown in FIG. 7, a call control device includes:

a receiving unit 810, configured to receive state information of a second session of a terminal from an SCC AS, where the second session needs to be transferred, and the state information indicates that the media type of the second session to be transferred is video; and a session transfer control unit 820, configured to: judge whether a target network domain of session transfer is capable of transmitting video data; if the target network domain of session transfer is not capable of transmitting video data, send to the SCC AS a request for transferring voice media of the second session to be transferred, whereupon the SCC AS converts the second session to be transferred into a voice session for transferring or releases the second session to be transferred after receiving the request.

Through the call control device in this embodiment, at the time of transferring the second to be transferred of the UE, if it is found that the target network domain is incapable of transmitting video data, a request is directly sent to the SCC AS for transferring the voice media of the second session to be transferred, for example, the video media transmission port number in the media row information of the request is set to 0, and only the voice media needs to be transferred. After receiving the request, the SCC AS converts the second session to be transferred into a voice session for transferring, or releases the second session to be transferred. Therefore, the failure of session transfer in the prior art is avoided, and the cross-network multi-session transfer service is improved.

Embodiment 4

Figure 8:
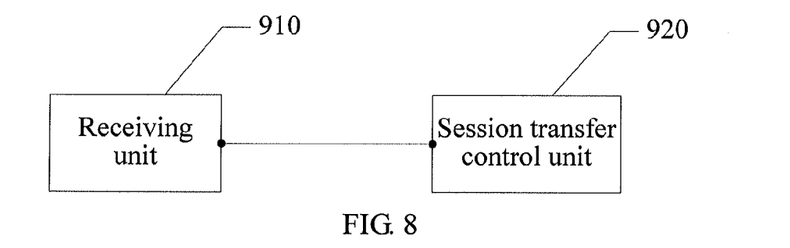
FIG. 8 is a schematic structure diagram of a call control device according to Embodiment 4 of the present invention.

As shown in FIG. 8, a call control device includes:

a receiving unit 910, configured to receive state information of a second session of a terminal from an SCC AS, where the second session needs to be transferred, the state information includes a media type of the second session to be transferred, and the media types include video; and a session transfer control unit 920, configured to: judge whether a target network domain of session transfer is capable of transmitting video data; if the target network domain of session transfer is not capable of transmitting video data, send to the SCC AS an indication of failure of transferring the second session to be transferred, whereupon the SCC AS converts the second session to be transferred into a voice session for transferring or releases the second session to be transferred after receiving the indication.

Through the call control device in this embodiment, at the time of transferring the second session to be transferred of the UE, if it is found that the target network domain is incapable of transmitting video data, an indication of failure of transferring the second session to be transferred is sent to the SCC AS so that the SCC AS performs subsequent operations upon receiving the indication of failure. Therefore, the failure of session transfer in the prior art is avoided, and the cross-network multi-session transfer service is improved.

The call control devices in the third embodiment and the fourth embodiment may be network entities capable of call control in the CS network, for example, an MSC server or a similar device.

Embodiment 5

Figure 9:
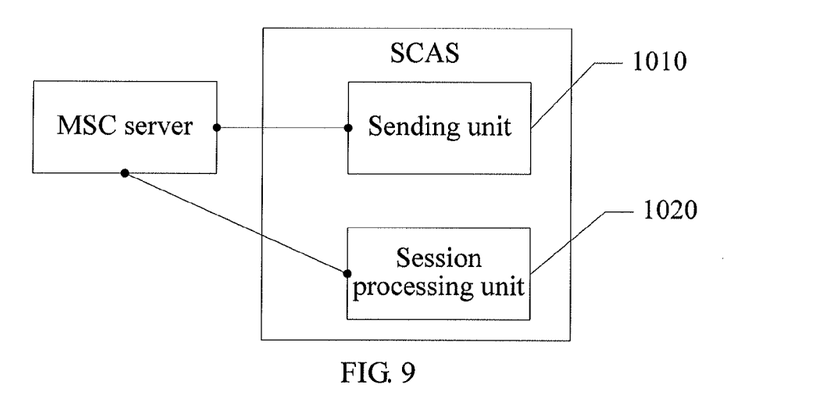
FIG. 9 is schematic structure diagram of an SCC AS according to Embodiment 5 of the present invention.

As shown in FIG. 9, an SCC AS includes:

a sending unit 1010, configured to send state information of a second session of a terminal to an MSC server that serves the terminal, where the second session needs to be transferred, the state information includes a media type of the second session to be transferred, and the media types include video; and a session processing unit 1020, configured to receive a request for transferring voice media of the second session to be transferred from the MSC server, and convert the second session to be transferred into a voice session for transferring or release the second session to be transferred.

For the working methods of the call control device and the SCC AS, see the method embodiments described above.

Embodiment 6

Figure 10:
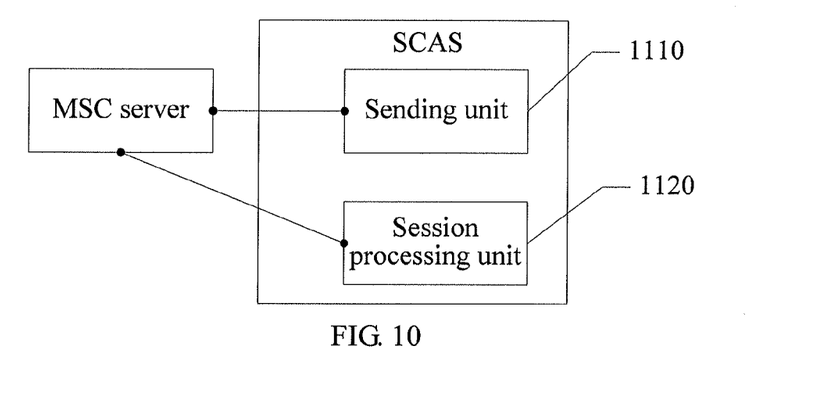
FIG. 10 is schematic structure diagram of an SCC AS according to Embodiment 6 of the present invention.

As shown in FIG. 10, an SCC AS includes:

a sending unit 1110, configured to send state information of a second session of a terminal to an MSC server that serves the UE, where the second session needs to be transferred, and the state information indicates that the media type of the second session to be transferred is video; and a session processing unit 1120, configured to: receive an indication sent by the MSC server because a target network domain is incapable of transmitting video data, where the indication indicates failure of transferring the second session to be transferred; and convert the second session to be transferred into a voice session for transferring, or release the second session to be transferred.

Disclosed above are a multi-session transfer method, a call control device, and an SCC AS. he principle and implementation of the present invention are described herein through specific examples. The description about the embodiments of the present invention is merely provided for ease of understanding of the method and core ideas of the present invention. Persons of ordinary skill in the art can make variations and modifications to the present invention in terms of the specific.

What is claimed is:

1. A control device, comprising a processor and a memory that stores computer program instructions that, when executed by the processor, causes the processor to perform the following steps:
    receive state information of a second session of a terminal sent from a Service Centralization and Continuity (SCC) Access Server (AS), wherein the state information comprises a media type of the second session, and media type comprises video;
    determine whether a target network domain of session transfer is capable of transmitting video data; and
    if the target network domain of session transfer is not capable of transmitting video data, send to the SCC AS a first request for transferring voice media of the second session to be transferred, wherein a video media transmission port number in a media row information in the first request is set to 0, and the first request is used to indicate that the second session is a multimedia session inclusive of video media, to prompt the SCC AS to convert the second session into a voice session.

2. The control device according to claim 1, wherein the source network domain is a Packet-Switched (PS) domain and the target network domain is a Circuit-Switched (CS) domain.

3. A system, comprising a Mobile Switching Center (MSC) and a Service Centralization and Continuity (SCC) Access Server (AS), wherein:
    the SCC AS is configured, after completion of transferring a first session of a terminal from a source network domain to a target network domain, to send state information of a second session of the terminal to the MSC;
    the MSC is configured to receive the state information of a second session of the terminal sent from the SCC AS, wherein the second session needs to be transferred, the state information comprises a media type of the second session to be transferred, and media types comprise video; and send a first request for transferring voice media of the second session to the SCC AS if the MSC determines that the target network domain is incapable of transmitting video data wherein a video media transmission port number in a media row information in the first request is setting to 0; and
    the SCC AS is further configured to determine the second session corresponding to the first request is a multimedia session inclusive of video media; and convert the second session into a voice session.

4. The system according to claim 3, wherein the SCC AS is further configured to:
    generate a second request for releasing media, and a port number corresponding to the video media row in the second request for releasing media to 0; and
    transmit the second request to the terminal.

5. The system according to claim 3, the SCC AS is further configured to release the video media in the source network domain.

* * * * *